United States Patent Office
2,979,536
Patented Apr. 11, 1961

2,979,536
PROCESS FOR THE PREPARATION OF 2,3-, 2,4-, AND 2,5-DICHLOROSTYRENE

Frederick J. Soderquist, Essexville, and James L. Amos, Midland, Mich., assignors to The Dow Chemical Company, Midland, Mich., a corporation of Delaware No Drawing. Filed June 26, 1957, Ser. No. 668,026

6 Claims. (Cl. 260—650)

This invention concerns the preparation of 2,3-, 2,4-, and 2,5-dichlorostyrene. More particularly, it concerns a process wherein 2,3-, 2,4-, and 2,5-dichloroisopropylbenzene, hereinafter referred to as an isomeric dichlorocumenes, are demethanated to give the corresponding dichlorostyrenes.

The preparation of dichlorostyrenes by the catalytic or thermal dehydrogenation of dichloroethylbenzenes is well known. Similarly, the preparation of dichloroisopropenylbenzenes from certain dichlorocumene isomers is known.

In accordance with this invention, it has now been discovered that isomeric dichlorocumenes, including mixtures thereof, wherein one of the chloro substituents is ortho to the isopropyl substituent, can be catalytically or thermally demethanated at elevated temperatures to yield the corresponding dichlorostyrenes. The process of this invention thus comprises in one of its aspects passing at least one of the isomeric dichlorocumenes having one chloro substituent ortho to the isopropyl substituent, advantageously in admixture with an inert diluent gas such as steam, nitrogen, carbon dioxide, non-reactive hydrocarbons such as methane, vaporized benzene, unconverted dichlorocumenes themselves and the like over a demethanating catalyst at a reaction temperature between 525° and 750° C. and preferably between 600° and 700° C., cooling the effluent gases to condense liquid product, and fractionating, preferably under vacuum, to obtain the desired dichlorostyrene product. In its other aspect, the demethanating reaction of this invention can be carried out at similar temperatures in the absence of catalyst.

Operable dichlorocumenes include the 2,3-, 2,4-, and 2,5-dichlorocumenes and mixtures thereof.

Demethanating catalysts which are advantageously used include (1) the activated or calcined aluminas, including the activated bauxites, and (2) chromic oxide and mixtures thereof with ferric oxide.

The proportion of diluent to feed stock when added diluent is used can be varied widely, advantageously between 0.02 and 10 parts by weight of diluent per part of feed stock. A proportion of 3 parts by weight of diluent per part of feed stock is preferred.

A space velocity between 5 and 100 grams of oil feed per 80 mls. of catalyst (or per 80 mls. of cracking zone when no catalyst is used) per hour can advantageously be used. However, a space velocity of 20 g. of oil feed per 80 mls. of catalyst per hour is preferred.

In practice, a feed stock of one or more of the indicated dichlorocumenes advantageously together with added diluent is passed through a reaction zone maintained at a reaction temperature between 525° and 750° C. at a space velocity between 5 and 100, as indicated. Effluent from the reaction zone is cooled to condense liquid product. Water is separated therefrom when steam is used as diluent. The liquid product is then fractionated to separate the desired dichlorocumenes.

The following examples show ways in which the invention has been practiced.

EXAMPLE I.—PREPARATION OF 2,3-DICHLOROSTYRENE FROM 2,3-DICHLOROCUMENE

A quantity of 699 g. of 2,3-dichlorocumene of 98.3 percent purity at a rate of 19.4 g. per hour and 2249 g. of steam at a rate of 62.5 g. per hour was passed over 80 mls. of an activated alumina catalyst promoted with ferric oxide. A continuous operation was conducted for 36 hours during which time the catalyst temperature was gradually raised from 600° to 690° C. A quantity of 632 g. of liquid product was recovered by cooling the effluent gases and separating and discarding condensed water. The liquid product was distilled and analyzed by infra-red spectrometry. The product contained the following:

| | Percent by weight |
|---|---|
| Benzene | 0.06 |
| Toluene | 0.14 |
| Xylenes | 0.22 |
| Dichlorobenzenes | 1.60 |
| Styrene | 0.21 |
| Isopropylbenzene | 0.02 |
| α-Methylstyrene | 0.03 |
| 2,3-dichlorostyrene | 9.50 |
| 2,3-dichloroisopropylbenzene | 86.00 |
| 2,3-dichloroisopropenylbenzene | 0.00 |
| Unidentified higher boilers | 2.40 |

Calculations based on the above run indicate 8.2 percent conversion to 2,3-dichlorostyrene and 25.9 percent yield based on 2,3-dichlorocumene consumed. Unconverted feed can be recycled.

EXAMPLE II. — PREPARATION OF MIXED DICHLOROSTYRENES FROM MIXED DICHLOROCUMENES

A quantity of 1117 grams of dichlorocumenes having an isomer distribution of 16 percent 2,3-dichlorocumene, 68 percent 2,4-, and 2,5-dichlorocumenes combined, and 16 percent of 3,4-dichlorocumene was passed with 2975 g. of steam over the same catalyst and reacted at the same temperature range as that employed in Example I. Throughput rates were 21.5 g. per hour of hydrocarbon and 57.0 g. per hour of steam for a total time of 52 hours. A quantity of 935 g. of liquid hydrocarbon was recovered having the following analysis:

| | Percent by weight |
|---|---|
| Chlorobenzene | 0.8 |
| Dichlorobenzene | 8.9 |
| Isopropylbenzene | 0.6 |
| Dichlorostyrenes | 28.2 |
| Dichlorocumenes | 50.6 |
| 3,4-dichloroisopropenylbenzene | 3.9 |
| Undetermined and higher boilers | 7.0 |

Based on the above data, the following conversions and yields were calculated, based on an 83.7 percent recovery:

| | |
|---|---|
| Percent conversion to 2,3-, 2,4-, and 2,5-dichlorostyrene | 24.7 |
| Percent yield to 2,3-, 2,4-, and 2,5-dichlorostyrene | 41.5 |
| Percent conversion to 3,4-dichloroisopropenylbenzene | 3.1 |
| Percent yield to 3,4-dichloroisopropenylbenzene | 5.2 |

In contrast thereto, 735 g. of a dichlorocumene isomer mixture consisting essentially of 85 percent 3,4-dichlorocumene and 14 percent 2,3-dichlorocumene was passed together with 2405 g. of steam over 80 mls. of an activated alumina catalyst promoted with ferric oxide at rates of 19.4 g. and 63.3 g. per hour, respectively. Total time was 38 hours, during which time the catalyst temperature was gradually raised from 600° to 700° C. A quantity of 700 g. of liquid hydrocarbon product was recovered having the following analysis:

| | Percent by weight |
|---|---|
| Chlorobenzene | 0.2 |
| Dichlorobenzene | 2.2 |
| Styrene | 0.5 |
| 2,3-dichlorostyrene | 7.7 |
| Dichlorocumenes | 56.6 |
| 3,4-dichloroisopropenylbenzene | 32.9 |
| Undetermined | Negligible |

Based on the above recoveries, the following conversion and yield data were adduced:

| | |
|---|---|
| Percent conversion to 2,3-dichlorostyrene | 8.0 |
| Percent yield to 2,3-dichlorostyrene | 17.3 |
| Percent conversion to 3,4-dichloroisopropenylbenzene | 31.6 |
| Percent yield to 3,4-dichloroisopropenylbenzene | 68.4 |

It is apparent from the foregoing examples that dichlorostyrenes having one chloro substituent ortho to the isopropyl substituent can be demethanated to the corresponding dichlorostyrenes pursuant to the process of this invention, whereas other dichlorocumenes are largely dehydrogenated to the corresponding dichloroisopropenylbenzenes under otherwise similar reaction conditions.

The following table summarizes results obtained with various feed stocks, catalysts, diluents, and reaction temperatures, pursuant to the process of this invention. All runs were made at a space velocity of 20 grams of oil feed per 80 mls. of catalyst or cracking zone per hour.

milliliters of cracking zone per hour, whereby demethanation of the isopropyl group predominates to the substantial exclusion of dehydrogenation, and recovering a dichlorostyrene product therefrom.

2. The method of claim 1 wherein the demethanating zone temperature is varied between 600° and 700° C.

3. The method of claim 1 wherein an inert diluent gas is added to the feed stock in amount ranging between 0.02 and 10 weight parts of diluent per part of feed stock.

4. The method of claim 1 wherein the demethanating zone contains a demethanating catalyst of the group consisting of activated aluminas, activated bauxites, chromic oxide, and mixtures of chromic oxide with ferric oxide.

5. The method of claim 1 wherein the space velocity is 20 grams of feed stock per 80 milliliters of cracking zone per hour.

6. A method for the preparation of a dichlorostyrene having one chloro substituent ortho to the vinyl group, which method comprises passing at least one member of the group consisting of 2,3-, 2,4-, and 2,5-dichlorocumene in admixture with steam diluent, the proportion by weight of steam to feed stock being 3 to 1, over a demethanating catalyst of the group consisting of activated aluminas, activated bauxites, chromic oxide and mixtures of chromic oxide with ferric oxide maintained at a temperature between 600° and 700° C. and at a space velocity of 20 grams of feed stock per 80 milliliters of catalyst per hour, whereby demethanation of the isopropyl group predominates to the substantial exclusion of dehydrogenation, cooling the effluent gases

*Table I*

DICHLOROSTYRENES FROM DICHLOROCUMENES

| Feed Stock | Catalyst | Temp. Range, °C. | Steam to Feed Stock Ratio | React'n Time, Hours | Crude Product Analysis | | | | | | | |
|---|---|---|---|---|---|---|---|---|---|---|---|---|
| | | | | | DCS[1] | DCC[2] | DCIPeB[3] | Percent Material Recovery | Percent Conv. to DCS | Percent Yield DCS | Percent Conv. to DCIPeB | Percent Yield DCIPeB |
| 100% 3,4-DCC | Act.Al$_2$O$_3$+Fe$_2$O$_3$ | 550-640 | 3.1:1 | 127 | 0.14 | 69.9 | 25.4 | 89.3 | 0 | 0 | 22.9 | 60.9 |
| 19% 2,3-DCC<br>33% 2,4-DCC<br>34% 2,5-DCC<br>14% 3,4-DCC | Act.Al$_2$O$_3$+Fe$_2$O$_3$ | 605-700 | 2.9:1 | 33 | 14.7 | 57.9 | 6.1 | 82.5 | 13.2 | 25.3 | 5.1 | 9.8 |
| 16% 2,3-DCC<br>68% 2,4- and 2,5-DCC<br>16% 3,4-DCC | None | 605-700 | 3.0:1 | 38 | 10.3 | 67.9 | 2.0 | 90.8 | 10.2 | 26.6 | 1.8 | 4.8 |
| 16% 2,3-DCC<br>68% 2,4- and 2,5-DCC<br>16% 3,4-DCC | Act.Al$_2$O$_3$+Fe$_2$O$_3$ | 625-700 | 3.0:1 | 12 | 19.2 | 45.8 | 8.0 | 71.7 | 15.0 | 22.3 | 5.8 | 8.6 |
| 85% 3,4-DCC<br>14% 2,3-DCC | Act.Al$_2$O$_3$+Fe$_2$O$_3$ | 600-700 | 3.1:1 | 38 | 6.7 | 49.6 | 28.8 | 90.7 | 6.6 | 12.0 | 26.4 | 48.0 |
| 85% 3,4-DCC<br>14% 2,3-DCC | None | 600-700 | 3.1:1 Nitrogen Diluent | 38 | 10.0 | 73.7 | 6.4 | 94.9 | 10.4 | 34.6 | 6.1 | 20.0 |
| 16% 2,3-DCC<br>68% 2,4- and 2,5-DCC<br>16% 3,4-DCC | Act.Al$_2$O$_3$+Fe$_2$O$_3$ | 600-690 | 1:1 N$_2$ to HC Ratio | 43 | 16.6 | 50.9 | 6.0 | 87.3 | 15.8 | 28.5 | 5.3 | 9.5 |
| 16% 2,3-DCC<br>68% 2,4- and 2,5-DCC<br>16% 3,4-DCC | None | 600-700 | 1:1 N$_2$ to HC Ratio | 45 | 15.6 | 56.6 | 2.6 | 94.4 | 16.1 | 34.6 | 2.5 | 5.3 |

[1] DCS=Dichlorostyrene.
[2] DCC=Dichlorocumene.
[3] DCIPeB=Dichloroisopropenylbenzene.

What is claimed is:

1. A method for preparing a dichlorostyrene having one chloro substituent ortho to the vinyl group, which method comprises passing at least one member of the group consisting of 2,3-, 2,4-, and 2,5-dichlorocumene through a demethanating zone maintained at a temperature between 525° and 750° C. at a space velocity between 5 and 100 grams of said dichlorocumene per 80 to condense liquid product, separating water therefrom, and fractionating said liquid product to separate and recover a dichlorostyrene product.

References Cited in the file of this patent

UNITED STATES PATENTS

| | | |
|---|---|---|
| 2,110,829 | Dreisbach | Mar. 8, 1938 |
| 2,486,379 | Amos et al. | Nov. 1, 1949 |